United States Patent
Akimoto et al.

(10) Patent No.: US 6,592,353 B1
(45) Date of Patent: Jul. 15, 2003

(54) DOUGH DISTRIBUTION DEVICE OF EXTRUDER

(75) Inventors: Shuji Akimoto, Sakado (JP); Hajime Hamada, Sakado (JP); Noriyuki Manada, Sakado (JP)

(73) Assignee: Meiji Seika Kaisha, Ltd., Tokyo (JP)

( * ) Notice: Subject to any disclaimer, the term of this patent is extended or adjusted under 35 U.S.C. 154(b) by 0 days.

(21) Appl. No.: 09/831,827

(22) PCT Filed: Jan. 24, 2000

(86) PCT No.: PCT/JP00/00320

§ 371 (c)(1),
(2), (4) Date: May 15, 2001

(87) PCT Pub. No.: WO00/42870

PCT Pub. Date: Jul. 27, 2000

(30) Foreign Application Priority Data

Jan. 25, 1999 (JP) ............................................. 11-16275

(51) Int. Cl.[7] .............................. A21C 9/02; B29C 47/70
(52) U.S. Cl. ................................ 425/131.1; 425/381.2; 425/382 N; 425/464; 426/516
(58) Field of Search ................................. 426/512, 516; 425/131.1, 199, 204, 376.1, 381.2, 382 N, 461, 464

(56) References Cited

U.S. PATENT DOCUMENTS

| | | | | |
|---|---|---|---|---|
| 3,487,142 A | * | 12/1969 | Johnson et al. | ........... 264/176.1 |
| 4,217,083 A | * | 8/1980 | Machuque | ................... 425/198 |
| 4,772,197 A | * | 9/1988 | Heck | ........................... 425/199 |
| 5,869,106 A | * | 2/1999 | Rosaldo | ................... 425/131.5 |
| 6,277,425 B1 | * | 8/2001 | Nash et al. | ................. 426/516 |

FOREIGN PATENT DOCUMENTS

| | | |
|---|---|---|
| EP | 0 240 699 | 10/1987 |
| JP | 61-19445 | 1/1986 |

* cited by examiner

*Primary Examiner*—Robert Davis
*Assistant Examiner*—Thu Khanh T. Nguyen
(74) *Attorney, Agent, or Firm*—Wenderoth, Lind & Ponack, L.L.P.

(57) ABSTRACT

A device (10) for distributing expandable dough to plural holes (5A) is provided at a terminal end of a rotor (3) in an extruder to form plural expanded confectioneries, each of which has a rod-like configuration. A first member (20) with a through hole (22) at central portion thereof has plural and radial channels (24), and a second member (30) connected to the first member has a multi-faced pyramid-like projection (34) at a central portion of the inner wall therof. The inner wall has channels (36), each radially extending from a base of a face of the projection. The channels in the second member and the other channels in the first member are opposingly arranged in alignment to form diverging flow passages for the expandable dough. The second member has plural bores (32) arranged so as to form a concentric circle, and one each of each bore communicates with one end of the diverging flow passage while the other end is opened to form an expanding portion for the confectionery dough.

12 Claims, 4 Drawing Sheets

DOUGH DISTRIBUTION DEVICE OF EXTRUDER

FIELD OF THE INVENTION

The present invention relates to a device for extruding an expandable dough for confectionery from plural openings of the device to prepare expanded confectionery (sticks). More particularly, the invention relates to a device for distributing the expandable dough formed at a terminal end of a rotor in an extruder to the plural openings.

BACKGROUND OF THE INVENTION

As extruders for preparing expanded confectioneries, in general, a single or twin screw type device has been employed, and each device comprises a screw(s) which shall be referred to in this Description as "rotor(s)", a barrel and a device for distributing an expandable dough, which has openings for expanding the dough. A starch raw material fed into the extruder from a raw material feeding port at a beginning end of the rotor is heated, pressurized, and subjected to shear force by the rotor in the barrel to gelatinize the material and make it into the expandable dough. The dough is then fed to the openings of the dough distributing device arranged at a terminal end of the rotor and expands whereby the expanded confectionery is prepared.

In such conventional apparatuses for preparing expanded confectioneries, a portion of each dough distributing device has a structure as shown in FIGS. 6 or 7.

The dough distributing device shown in FIG. 6 comprises a flat plate or disc B arranged at a terminal end of a rotor A and having through hole $B_1$ at a central portion thereof, a diverging member C to distribute an expandable dough together with the flat plate, and an opening forming plate D fixed to a terminal end of the diverging member and having plural openings $D_1$. However, the expandable dough dwells on inner wall $C_1$ of the diverging member C, which is arranged opposite to the through hole $B_1$ and the vicinity thereof to cause thermal scorching phenomenon, whereby an amount of the dough flowing into each of the plural openings $D_1$ changes. This means that each of the expanded confectioneries obtained by the expanded confectionery preparing apparatus provided with such a dough distributing device is not uniform in quality thereof.

The dough distributing device shown in FIG. 7 is structurally different from that shown in FIG. 6 in that a cavity $B_2$ is formed in a rotor-side surface of a flat plate or disc B arranged at the terminal end of a rotor A and having a through hole $B_1$, in that the structure of the diverging member is simplified, and in that plural openings $C_2$ are formed in the diverging member per se. In this dough distributing device, an expandable dough for confectionery passed the through hole $B_1$ is uniformly and spreadingly fed to the plural openings $C_2$, by actions of an outer wall of the flat plate B and the inner wall of the diverging member C, and is distributed to the openings. However, a phenomenon similar to that occurring in the dough distributing device shown in FIG. 6 occurs and the expandable dough for confectionery dwells on the inner wall $C_1$ of the diverging member C and a vicinity thereof, and each of the expanded confectioneries formed through plural openings is not so uniform in quality.

In Japanese Patent 62-259538(A) as one of patent literatures, there is disclosed a screw extruder for extrudingly preparing various foods by supplying thereto raw material dough. An extruding passage is diverged into plural diverging passages, each having the same shape and the same length, and a food extruding die is fixed to each tip end of the diverging passage. When the extruder is applied for preparing an expanded confectionery, uniformity in the overall quality of the products shall be improved, but non-uniformity in the quality of each expanded confectionery formed though each of the extruding holes in the die can still not be overcome.

In Japanese Patent 61-19445(A), further, an "apparatus for preparing expanded snack confectionery" has been disclosed. A dough distributing device for the apparatus is shown in FIG. 8. The dough distributing device has a structure such that a flat plate F is arranged between a rotor A of a single screw extruder and a die portion E, with a slight gap from tip end of the rotor. The flat plate has a through hole $F_1$ at a central portion thereof and a dough guiding cavity F2 at a die side surface to communicate the through hole with die openings $E_1$. When the apparatus for preparing expanded snack confectionery and provided with the dough distributing device is employed, uniformity in the overall quality of the products can be improved, but if depth T of the dough guiding cavity is different from diameter W of each of the die openings, non-uniformity in quality is still present between the expanded confectioneries formed through plural die openings.

Therefore, an object of the invention is to provide a device for distributing an expandable dough for confectioneries, which drastically reduces non-uniformity in quality of each of expanded confectioneries extrudingly and concurrently formed through each of plural openings at terminal end of an extruder.

SUMMARY OF THE INVENTION

Fundamentals of the invention lie in immediately diverging flow of an expandable dough passed through rotor portion of a single or twin rotor extruder, and feeding each of the expandable dough flows to a relative opening to cause expansion of the dough for preparing a desired expanded confectionery.

Therefore, a device for distributing dough in an extruder according to the invention includes a first member arranged near a terminal end of a rotor in the extruder, and the first member has a through hole for the expandable dough at a central portion thereof and has radial channels which communicate with the through hole. A second member is connected to the first member, and has bores corresponding in number to the number of radial channels in the first member and arranged so as to form a concentric circle. The second member has an inner wall with a multi-faced pyramid-like projection on a central portion of the inner wall, and the inner wall has radial channels extending from the base of the projection. Each free end of the radial channels communicate with each end of the bores. The radial channels in the first member and the radial channels in said second member are opposingly arranged in alignment to form diverging flow passages for the expandable dough, and the sectional size of the diverging flow passage is the same as that of the bore formed in the second member.

According to the dough distributing device of the invention, each of the radial channels formed in the first and second members is oppositely arranged in alignment to form diverging flow passages for the expandable dough, and each end of the diverging flow passages communicates to each end of the bores formed in the second member. Thus, there is no portion for causing the expandable dough that has passed the through hole formed in the first member to dwell.

Therefore, an amount of the expandable dough extruded from each free end of the bores becomes substantially the same, so that the quality of the expanded confectioneries obtained through each of the bores shall become uniform.

If a somewhat thick end plate formed with through holes somewhat large in diameter is attached to the outer wall of the second member, the state of the expanded confectionery becomes more preferable.

DETAILED DESCRIPTION OF THE INVENTION

The invention will now be explained in more detail with reference to FIGS. 1–5, and then with examples for preparing expanded confectioneries and Test Examples on the resulting expanded confectioneries.

Figure 1:
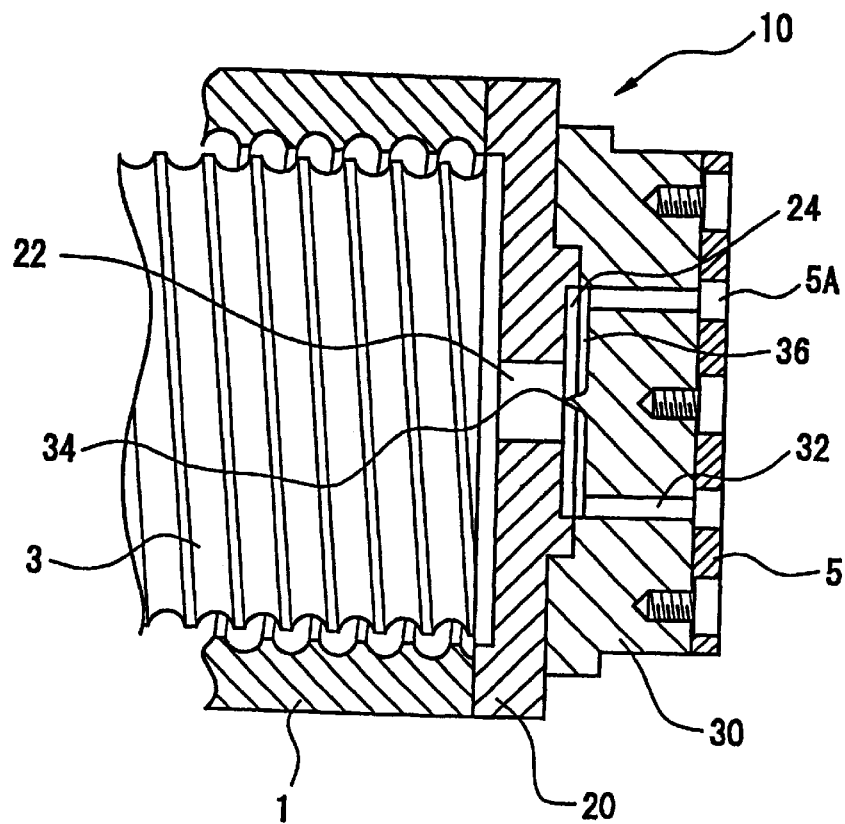
FIG. 1 is a diagrammatic vertical section of a dough distributing device for preparing expanded confectioneries, according to the invention.

FIG. 1 shows a dough distributing device 10 for expanded confectioneries, according to the invention. The dough distributing device is attached near a terminal end of a rotor 3. The application of compressive and shearing forces to a starch raw material fed into a barrel 1 at the beginning end of the rotor 3 results in generating increased temperature in the dough, so that the raw material can be made into gelatinized expandable dough. To a second member 30 of the dough distributing device, plural through bores 32 are formed on a concentric circle. If necessary, a somewhat thick end plate 5 with through holes 5A is connected to the second member 30, and the through holes 5A communicate with the bores 32 in the second member 30 and have a diameter somewhat larger than that of the bores, to provide a change in the visual appearance of the expanded confectionery to be prepared.

The dough distributing device 10 is constructed with a first member 20 arranged at the rotor-side and having a through hole 22 for the expandable dough at a central portion thereof The second member 30 has plural through-bores 32 which are arranged so as to form a concentric circle, and a multi-faced pyramid-like projection 34 is provided at a central portion of the inner surface of the second member 30.

Figure 2:
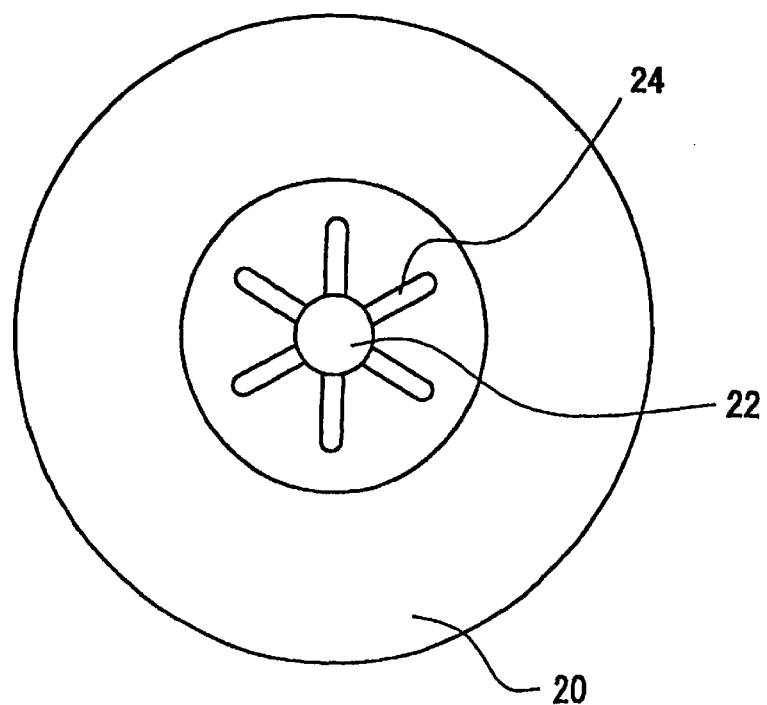
FIG. 2 is a front view of a first member of the expandable dough distributing device shown in FIG. 1.
Figure 3:
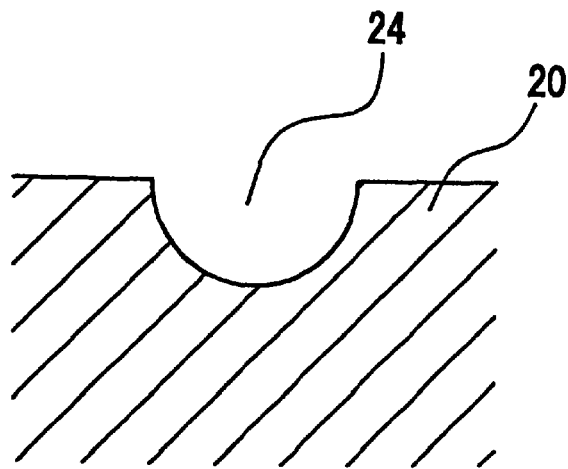
FIG. 3 is an enlarged partial section showing one of the radial channels shown in FIG. 2.

In the outer wall front surface of the first member 20, as shown in FIG. 2, plural channels 24 are formed, and each of the channels 24 communicates with the through hole 22 and radially extends from the through hole 22. In FIG. 2, 6 radial channels are shown, but the number of channels shall not be limited thereto and should be the same as the number of through-bores 32 formed in the second member 30. One exemplary sectional shape of the radial channels 24 formed in the first member is shown in FIG. 3.

Figure 4:
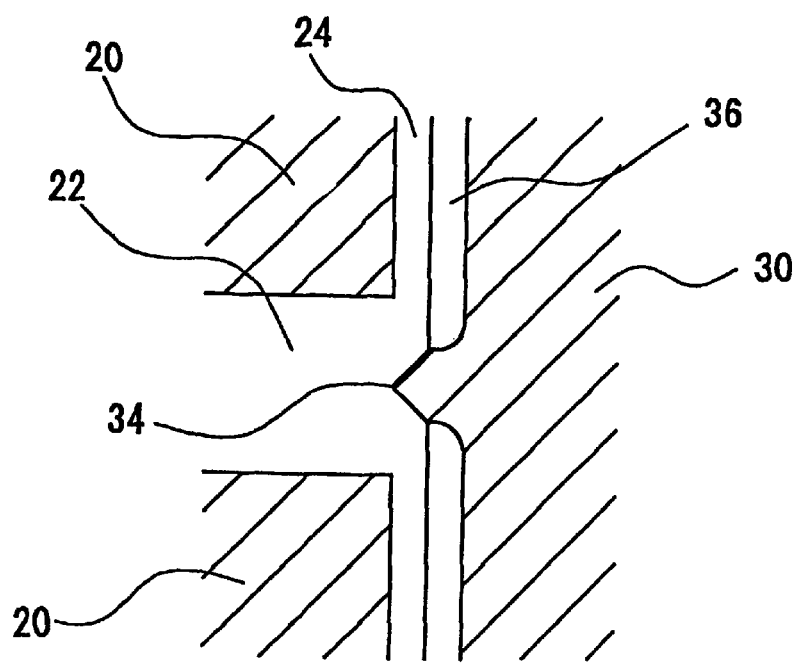
FIG. 4 is an enlarged partial section showing diverging passages of the expandable dough.
Figure 5:
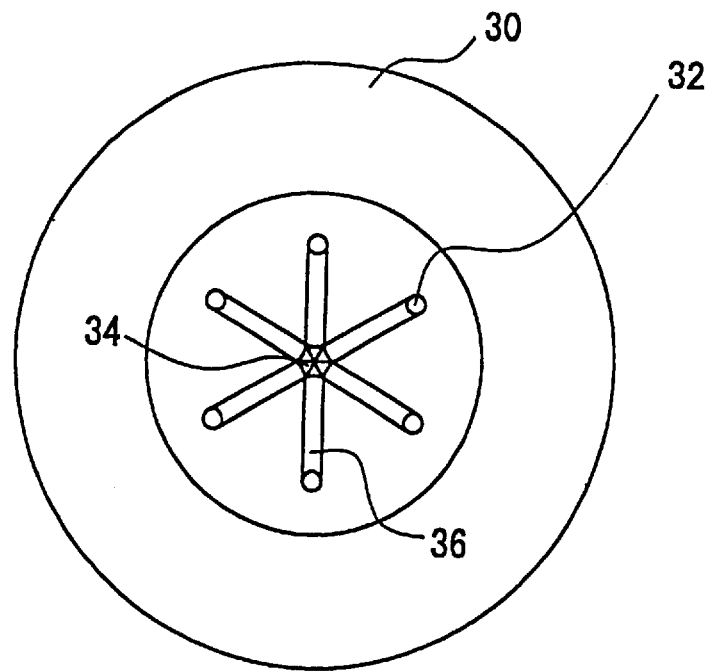
FIG. 5 is a rear view of a second member in the expandable dough distributing device shown in FIG. 1.

FIG. 4 shows a positional relationship between the through hole 22 and the radial channels 24 communicating with the through hole 22, (both the through hole 22 and channels 24 are formed in the first member 20), and the multi-faced pyramid-like projection 34 at the central portion of the inner wall of the second member 30 and channels 36 radially extending from the base of the pyramid-like projection. As shown in FIG. 5, each of the channels 36 radially extends from the base of each surface of the pyramid-like projection 34, along the rear surface of the second member and a free end of each channel 36 communicates with a corresponding one of the bores 32 arranged so as to form a concentric circle in the second member 30. In FIG. 5, 6 radial channels 36 are shown corresponding to the number of radial channels 24 formed in the first member 20 and shown in FIG. 2, and each of the pairs of channels is opposingly arranged in an alignment manner (see FIG. 4). In other words, the front surface of the first member 20 (having channels 24) is arranged to face the rear surface of the second member 30 (having channels 36) so that the channels 24 and channels 36 oppose each other and are aligned to form a plurality of passages.

When the expandable dough distributing device with this construction is attached to a front end of the extruder, namely a terminal end of the rotor, for preparing expanded confectionery, the expandable dough extrudingly fed by an action of the rotor 3 into the through hole 22 in the first member 20 is guided by the multi-faced pyramid-like projection 34 in the second member 30 to reach each of the bores 32 through each diverging flow passage formed by the radial channels (24, 36 in FIG. 4) in the first and second members (20, 30 in FIG. 1) and opposingly arranged in alignment manner. The dough is then extrudingly discharged from the opening of each bore to cause expansion for preparing the products. If the diameter of each diverging flow passage is the same as that of each bore, the expandable dough flows without dwellings. Therefore, the quality of the expanded confectionery prepared through each bore becomes substantially uniform.

If necessary, the end plate 5 (see FIG. 1) is attached to the expandable dough distributing device, and if the diameter of the through holes 5A arranged so as to form a concentric circle therein is larger than that of the bores 32 formed in the second member 20, configuration of the expanded products becomes better. In this case, it is preferable to set ratio of the diameters in the through hole and bore to about 2:1.

The invention is further explained with reference to examples for preparing expanded confectionery, which were carried out by attaching to an extruder a dough distributing device substantially the same as that described above, Test Examples carried out using the expanded confectioneries, Comparative Examples for preparing expanded confectionery, which were carried out using conventional dough distributing devices, and Test Examples carried using the expanded confectioneries which were obtained by the Comparative Examples.

MANUFACTURING EXAMPLE 1

The expandable dough distributing device shown in FIGS. 1–5 was attached to the terminal end of a rotor in a single rotor extruder (Model MS-25, manufactured by Aoi Seiki Kabushiki Kaisha, Japan), but which dough distributing device had four dough diverging flow passages and four bores in the second member as well as four holes in the third member or end plate. Sizes of various portions in the dough distributing device were as follows. Diameter of the through hole in the first member: 20 mm, opening width of each radial channel: 4 mm, depth of each radial channel: 2 mm, height of the multi-faced pyramid-like projection (tetrahedronal projection): 4 mm, opening width of the base at the projection and each of the radial channels in the second member: 4 mm, depth of the radial channels: 2 mm, diameter of each bore: 4 mm, and diameter of each hole in the third member or in the end plate: 4 mm.

A starch material prepared by adding 8 parts by weight of water into 100 parts by weight of corn grits and homogeneously mixing the same was fed into a raw material feeding port at the beginning end of the rotor of the extruder for gelatinizing the raw material by setting conditions to 200 rpm (rotational velocity of the rotor), 140° (temperature) and 4 MPa (pressure) to prepare an expandable dough for confectionery at the terminal end of the rotor in the extruder. The expandable dough was fed through the through hole in the first member, diverged into four uniform dough flows by the multi-faced pyramid-like projection, and forcedly fed into each of the diverging flow passages formed by the opposing and aligned arrangement of the radial channels to form the dough into dough ropes having a diameter of 4 mm. Each of the dough ropes was passed through the bore having a diameter of 4 mm to reach the through hole having diameter of 4 mm in the end plate to cause rapid expansion which makes the dough rope into expanded confectionery. Thereafter, the dough distributing device was disassembled to visually observe the inside thereof to find no scorched residue of the expandable dough, so that it has been ascertained that no dwelling phenomenon of the expandable dough has occurred during the passing of the dough distributing device.

The long rod-like expanded confectioneries were then cut into sections having a length of 10 cm to measure the weight of each sample for checking a difference in weight thereof Results are shown in Table 1 given later.

COMPARATIVE MANUFACTURING EXAMPLE 1

Figure 6:
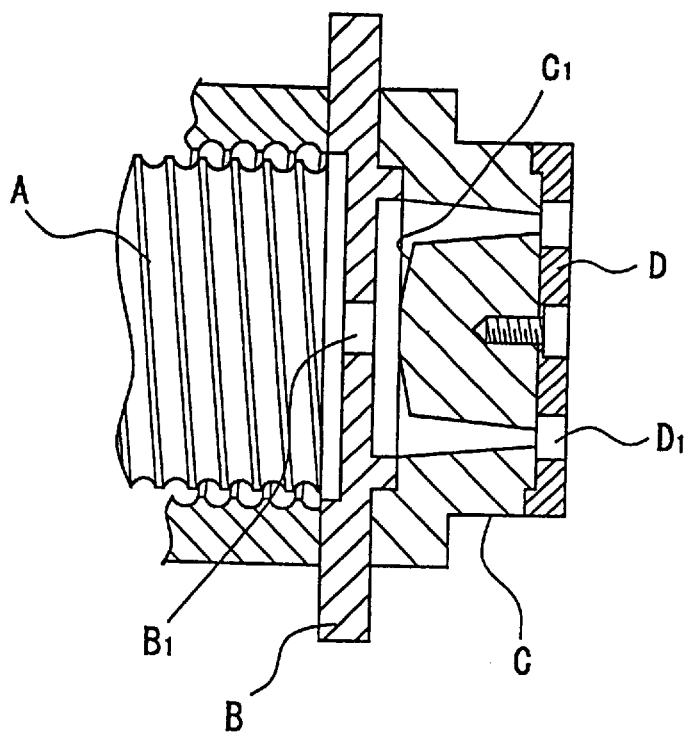
FIG. 6 is a diagrammatic vertical section of one of the conventional expandable dough distributing devices.
Figure 7:
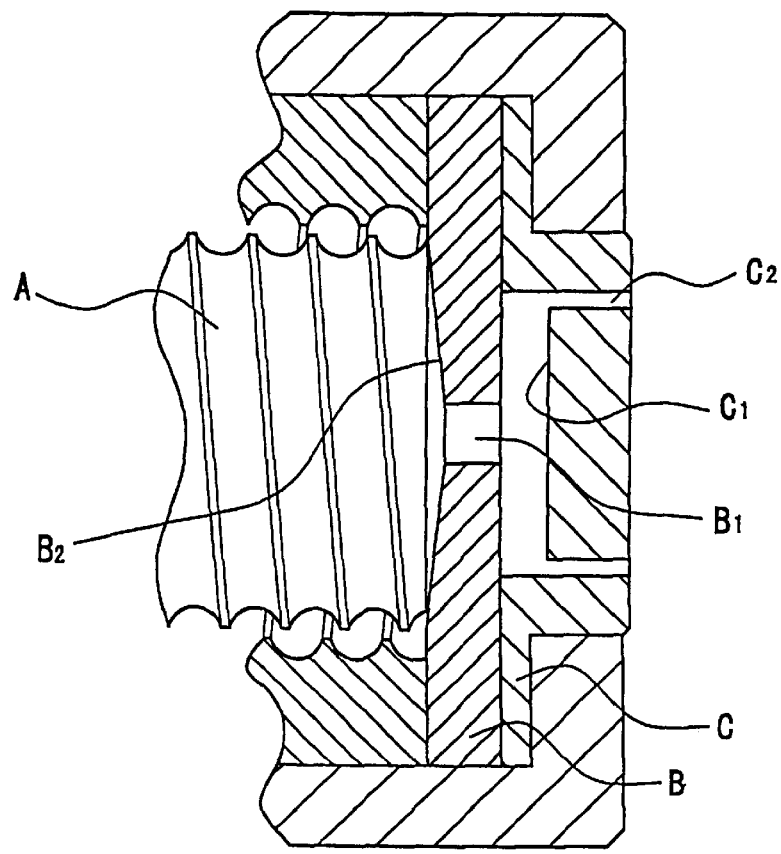
FIG. 7 is a diagrammatic vertical section of another conventional expandable dough distributing device.

A conventional expandable dough distributing device as shown in FIG. 6 was attached to terminal end of a rotor in the single rotor extruder (Model MS-25, manufactured by Aoi Seiki Kabushiki Kaisha, Japan). Sizes of the through hole, bores and hole in the dough distributing device are the same as those given in Manufacturing Example 1 to prepare expanded confectioneries. Thereafter, the dough distributing device was disassembled to observe the inside thereof As a result, scorched residue of the expandable dough has been recognized on inner wall $C_1$ of the diverging member, so that it has been ascertained that dwelling of the expandable dough has occurred during the passing thereof in the dough distributing device.

The expanded confectionery obtained by passing the dough through each of the bores was then cut as in Manufacturing Example 1 to check a difference in weight. Results are shown in the following Table 1.

TABLE 1

| | | Bore number | | | | |
| --- | --- | --- | --- | --- | --- | --- |
| | | 1 | 2 | 3 | 4 | Mean |
| Example 1 | Mean weight (g) | 1.12 | 1.10 | 1.09 | 1.10 | 1.1025 |
| | Standard deviation | 0.02 | 0.01 | 0.01 | 0.01 | 0.0125 |
| Comparative Example 1 | Mean weight (g) | 1.05 | 1.13 | 0.96 | 1.21 | 1.075 |
| | Standard deviation | 0.04 | 0.05 | 0.03 | 0.07 | 0.045 |

As shown in Table 1 above, it has been ascertained that differences in mean weight and standard deviation of each expanded confectionery manufactured through each bore become small by using the dough distributing device according to the invention as shown in FIG. 1, in comparison with the case using the conventional dough distributing device as shown in FIG. 6.

COMPARATIVE MANUFACTURING EXAMPLE 2

Figure 8:
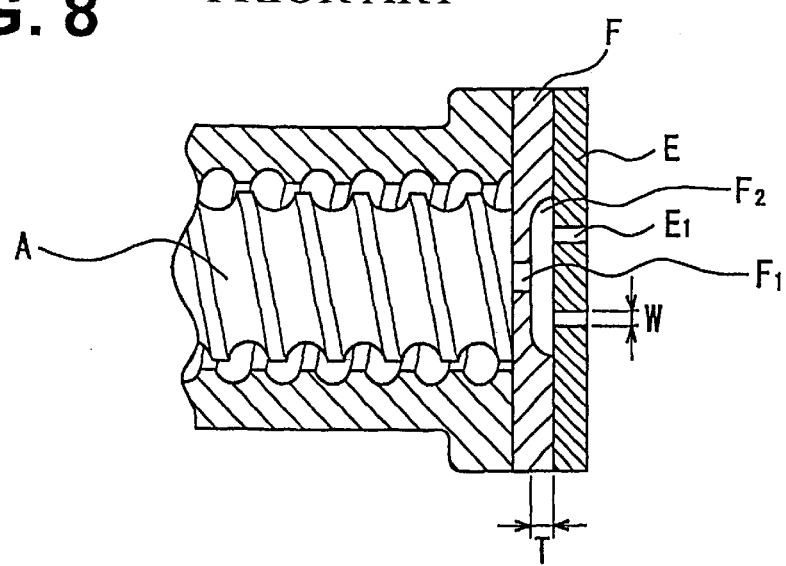
FIG. 8 is a diagrammatic vertical section of an expandable dough distributing device shown in Japanese Patent 61-19445(A).

Expanded confectionery was prepared by using the conventional dough distributing device shown in FIG. 8 under conditions of composition of the starch raw material, and operations for the extruder were the same as those in Manufacturing Example 1. In this dough distributing device, the diameter of the through hole was 20 mm and the diameter of each of the four bores was 4 mm.

The resulting expanded confectionery was cut as in Manufacturing Example 1 to measure weight for checking the differences thereof Results are shown in the following Table 2.

According to the results, the value on the standard deviation showing the difference in weight of the expanded confectionery is lower than that of the expanded confectionery obtained by Comparative Manufacturing Example 1, but is apparently larger than that of the expanded confectionery obtained by Manufacturing Example 1.

TABLE 2

| | Bore number | | | | |
| --- | --- | --- | --- | --- | --- |
| | 1 | 2 | 3 | 4 | Mean |
| Mean weight (g) | 1.22 | 1.18 | 1.27 | 1.26 | 1.233 |
| Standard deviation | 0.0281 | 0.0313 | 0.0356 | 0.0328 | 0.03195 |

MANUFACTURING EXAMPLE 2

The expandable dough distributing device as shown in FIGS. 1–5 was attached to the terminal end of rotors for a twin rotor extruder (Model BC45, manufactured by CLEXTRAL corporation). Moreover, each of the rotors with reverse spiral flight generating back pressure was attached at a portion from the terminal end of the twin rotor to a position of 1/10 of the full length of the twin rotor.

A composed mixture of wheat flour (75 parts by weight), potato starch (25 parts by weight), table salt (0.5 parts by weight), sugar (2.0 parts by weight) and vegetable oil (2.5 parts by weight) was fed into a raw material feeding port at the beginning end of the twin rotor, and water was concurrently supplied by using a pump arranged near the twin rotor extruder to obtain a mixed dough with a water content of 20 parts by weight.

The mixed dough was gelatinized by setting operation conditions of the extruder to 250 rpm (rotational velocity of the twin rotor), 180° (temperature) and 10 MPa (pressure) to prepare expandable dough which was extruded out from bores in the dough distributing device to obtain expanded confectionery by rapid expansion of the expandable dough.

The resulting expanded confectionery was cut as in Manufacturing Example 1 to measure for checking differences in the weight of samples. Results are shown in Table 3 given later.

COMPARATIVE MANUFACTURING EXAMPLE 3

Expanded confectionery was obtained by carrying out operations similar to those described in Manufacturing Example 3, except that the conventional dough distributing device as shown in FIG. 6 was used.

The resulting expanded confectionery was cut as in Manufacturing Example 1 to measure for checking differences in weight of the samples. Results are shown in following Table 3.

TABLE 3

| | | Bore number | | | | |
|---|---|---|---|---|---|---|
| | | 1 | 2 | 3 | 4 | Mean |
| Example 2 | Mean weight (g) | 1.18 | 1.20 | 1.22 | 1.20 | 1.20 |
| | Standard deviation | 0.0 | 0.0 | 0.0 | 0.0 | 0.0126 |
| Comparative Example 3 | Mean weight (g) | 1.30 | 1.24 | 1.20 | 1.26 | 1.25 |
| | Standard deviation | 0.0 | 0.0 | 0.0 | 0.0 | 0.0631 |

As shown in the above Table 3, it has been ascertained that differences in the mean weight and standard deviation of each expanded confectionery manufactured through each bore become small by using the dough distributing device according to the invention as shown in FIG. 1, as compared to the case using the conventional dough distributing device as shown in FIG. 6, or the case using the twin rotor extruder.

MANUFACTURING EXAMPLE 3

The expandable dough distributing device shown in FIGS. 1–5 was attached to a terminal end of a rotor in a single rotor extruder (Model MS-25, manufactured by Aoi Seiki Kabushiki Kaisha, Japan), but the dough distributing device has four dough diverging flow passages and four bores in the second member, as well as four holes in the third member or end plate. Sizes of various portions in the dough distributing device are as follows. Diameter of the through hole in the first member: 20 mm, opening width of each radial channel: 4 mm, depth thereof: 2 mm, height of the multi-faced pyramid-like projection (tetrahedronal projection) in the second member: 4 mm, opening width of the base at the projection and each of the radial channels: 4 mm, depth of each radial channel: 2 mm, diameter of each bore: 4 mm, and diameter of each through hole in the end plate 8 mm.

A starch material prepared by adding 8 parts by weight of water into 100 parts by weight of corn grits and homogeneously mixing the same was then fed into a raw material feeding port at the beginning end of the rotor in the extruder for gelatinizing the raw material by setting operational conditions at 200 rpm (rotational velocity of the rotor), 140° C. (temperature) and 4 MPa (pressure) to prepare an expandable dough for confectionery at the terminal end of the rotor in the extruder. The expandable dough was fed through the through hole in the first member, diverged into four uniform dough flows by the multi-faced pyramid-like projection, and forced into each of the diverging flow passages formed by the opposing and aligned arrangement of the radial channels to form the dough into dough ropes having a diameter of 4 mm. Each of the dough ropes was passed through the bore to reach the through hole having diameter of 8 mm in the end plate so as to cause rapid expansion. As a result, expanded confectionery was obtained. Thereafter, the dough distributing device was disassembled to visually observe the inside thereof to find no scorched residue of the expandable dough, so that it has been ascertained that no dwelling phenomenon of the expandable dough has occurred during the passing of the dough in the dough distributing device.

The long rod-like expanded confectioneries were then cut into sections having a length of 10 cm to measure the weight of each sample for checking difference in weight. Results thereof were substantially the same as those described in Manufacturing Example 1.

The expanded confectionery obtained by this Example showed a clear wave-like configuration on its surface.

Industrial Applicability

As referred to above, the weight in unit length of expanded confectionery products discharged from each opening of plural bores at the terminal end of the dough distributing device can be made substantially constant, when the expandable dough is treated by attaching the dough distributing device of the invention to a front end of the extruder. This is provided by the fact that no scorching of the expandable dough due to dwelling thereof inside of the expandable dough distributing device occurs, and it makes producion of the expanded confectionery smooth.

What is claimed is:

1. A device for distributing dough, comprising:

a first member to be positioned at a terminal end of a rotor of an extruder, said first member having a rear surface, a front surface, a center through-hole extending between said rear surface and said front surface, and a plurality of channels formed in said front surface so as to radially extend from and communicate with said center through-hole; and a second member connected to said first member, said second member having a rear surface, a front surface, a plurality of bores arranged so as to form a concentric circle with respect to said center through-hole of said first member, a pyramid-shaped projection extending from a center of said rear surface of said second member, and a plurality of channels formed in said rear surface so as to radially extend from a base of said pyramid-shaped projection toward said bores so that a distal end of each of said channels communicates with a respective one of said bores, each of said bores extending between said rear surface and said front surface of said second member, wherein said front surface of said first member faces said rear surface of said second member such that said radial channels of said first member oppose and align with said radial channels of said second member so as to form a plurality of radial flow passages for allowing expandable dough to flow from said center through-hole of said first member to said plurality of bores of said second member via said flow passages, a cross-sectional size of each of said flow passages being equal to a cross-sectional size of each of said bores of said second member.

2. The device of claim 1, wherein said pyramid-shaped projection has a plurality of side faces, each of said channels of said second member being formed in said rear surface of said second member so as to radially extend from a base of a respective one of said side faces of said pyramid-shaped projection toward a respective one of said bores.

3. The device of claim 2, wherein a quantity of said bores of said second member is equal to a quantity of said radial channels of said first member.

4. The device of claim 1, wherein a quantity of said bores of said second member is equal to a quantity of said radial channels of said first member.

5. The device of claim 1, further comprising an end plate positioned on said front surface of said second member, said end plate having a plurality of through-holes arranged in a circle so that each of said through-holes of said end plate is aligned with and communicates with a respective one of said bores of said second member.

6. The device of claim 5, wherein a diameter of each of said through-holes of said end plate is twice as large as a diameter of each of said bores of said second member.

7. A device for distributing dough, comprising:

an extruder including a barrel housing having a dough material inlet, and including a rotor operable to rotate within said barrel housing;

a first member connected to said barrel housing at a terminal end of said rotor of said extruder, said first member having a rear surface, a front surface, a center through-hole extending between said rear surface and said front surface, and a plurality of channels formed in said front surface so as to radially extend from and communicate with said center through-hole; and a second member connected to said first member, said second member having a rear surface, a front surface, a plurality of bores arranged so as to form a concentric circle with respect to said center through-hole of said first member, a pyramid-shaped projection extending from a center of said rear surface of said second member, and a plurality of channels formed in said rear surface so as to radially extend from a base of said pyramid-shaped projection toward said bores so that a distal end of each of said channels communicates with a respective one of said bores, each of said bores extending between said rear surface and said front surface of said second member;

wherein said front surface of said first member faces said rear surface of said second member such that said radial channels of said first member oppose and align with said radial channels of said second member so as to form a plurality of radial flow passages for allowing expandable dough to flow from said center through-hole of said first member to said plurality of bores of said second member via said flow passages, a cross-sectional size of each of said flow passages being equal to a cross-sectional size of each of said bores of said second member.

8. The device of claim 7, wherein said pyramid-shaped projection has a plurality of side faces, each of said channels of said second member being formed in said rear surface of said second member so as to radially extend from a base of a respective one of said side faces of said pyramid-shaped projection toward a respective one of said bores.

9. The device of claim 8, wherein a quantity of said bores of said second member is equal to a quantity of said radial channels of said first member.

10. The device of claim 7, wherein a quantity of said bores of said second member is equal to a quantity of said radial channels of said first member.

11. The device of claim 7, further comprising an end plate positioned on said front surface of said second member, said end plate having a plurality of through-holes arranged in a circle so that each of said through-holes of said end plate is aligned with and communicates with a respective one of said bores of said second member.

12. The device of claim 11, wherein a diameter of each of said through-holes of said end plate is twice as large as a diameter of each of said bores of said second member.

* * * * *